July 10, 1945.  H. P. KUEHNI  2,380,249
LIQUID LEVEL INDICATING DEVICE
Filed May 11, 1944
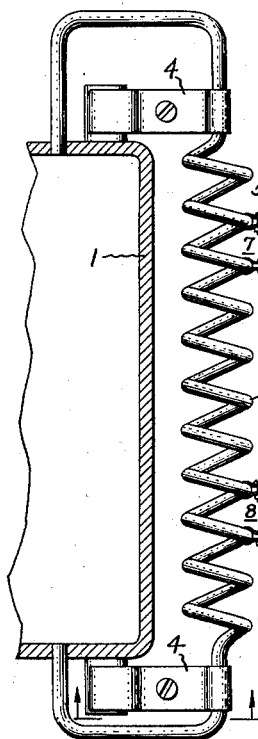
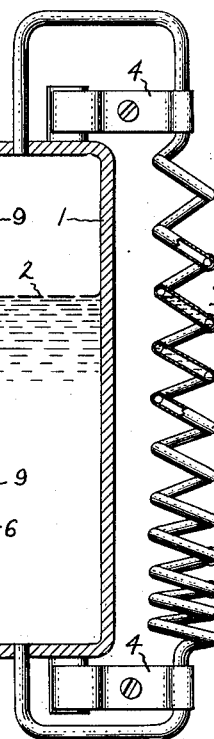
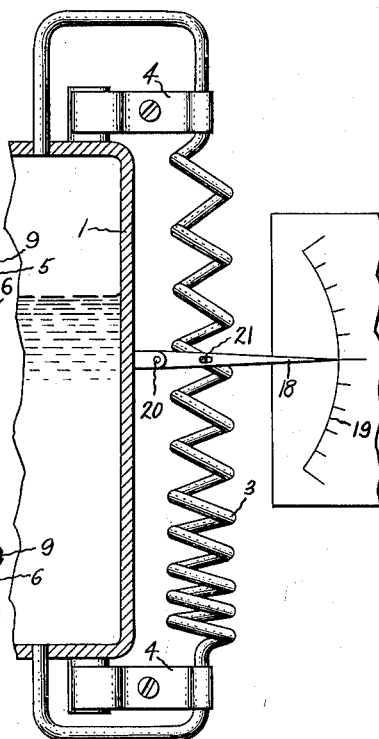
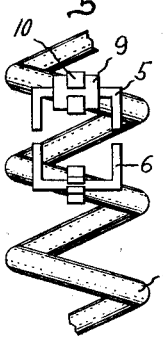
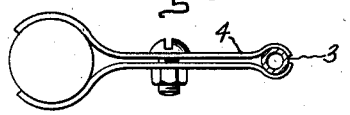
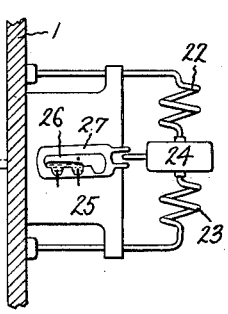
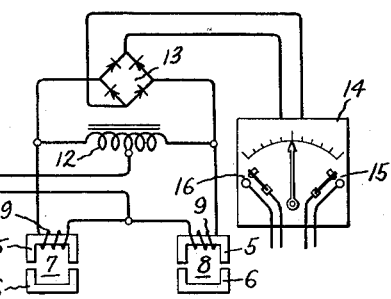
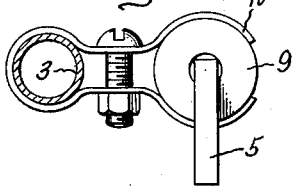
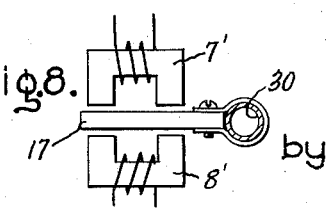
Inventor:
Hans P. Kuehni,
by Harry E. Dunham
His Attorney.

Patented July 10, 1945

2,380,249

UNITED STATES PATENT OFFICE 2,380,249

LIQUID LEVEL INDICATING DEVICE

Hans P. Kuehni, Schenectady, N. Y., assignor to General Electric Company, a corporation of New York Application May 11, 1944, Serial No. 535,098

3 Claims. (Cl. 73—296)

My invention relates to liquid level measuring and controlling apparatus and is particularly useful for measuring the liquid level in sealed tanks with high accuracy. One important advantage of my invention is that it may be used to measure the level of liquids having corrosive properties without difficulty. In carrying my invention into effect, I may provide a somewhat flexible tubular spiral column with the axis of the spiral vertical or substantially so and connect it with the liquid tank such that the liquid rises in the spiral column to the level of the liquid in the tank, and the weight of the liquid in the spiral column deforms the spiral. The deformation of the spiral is readily measured, preferably by sensitive electrical gauging apparatus calibrated in terms of liquid level.

The features of my invention which are believed to be novel and patentable will be pointed out in the claims appended hereto. For a better understanding of my invention, reference is made in the following description to the accompanying drawing in which Figs. 1 and 2 represent my improved gauging apparatus as applied to a tank, Fig. 1 indicating the condition of the apparatus with the tank empty and Fig. 2 with the tank partially filled with a liquid. Fig. 6 shows an electric gauge circuit suitable for use with Figs. 1 and 2. Figs. 3, 4, and 5 show details pertaining to Figs. 1 and 2. Fig. 7 shows a simple form of lever indicator which is operated mechanically by changes in shape of the spiral tubular column. Fig. 8 represents a single armature differential inductance that may be used.

Referring to Figs. 1 and 2, I represents a sealed tank or other liquid system which may contain more or less liquid 2 which may be assumed to be a corrosive liquid such as would make it impracticable to employ many of the conventional forms of liquid level gauges. I have provided a tubular spiral column 3 which may be formed from piping made of or lined with a material which will not be corroded with the liquid in question and which is slightly flexible. The column has several convolutions arranged in a substantially vertical column, and the upper and lower ends of the column are sealed into the upper and lower walls of the tank I as shown such that liquid will rise in the spiral column to the level of the liquid in the tank. The upper and lower extremities of the spiral column are securely held in fixed relation with the tank or other suitable supporting structure as by clamps 4, one being shown in plan in Fig. 3. When liquid rises in the spiral column, the weight of the liquid therein is added to the weight of the convolutions and the column is deformed. There is a separation of the upper convolutions and those near the bottom are compressed closer together. Thus Fig. 1 indicates that the convolutions are about uniformly spaced when empty of liquid, and Fig. 2 represents the nature of deformation when liquid is added. The extent of deformation represented in Fig. 2 is somewhat greater than is required when the sensitive electrical gauging apparatus to be described is employed. It is noted that the tubular spiral is in effect a spiral spring made out of tubing which is a liquid container.

Secured to adjacent convolutions near the top and bottom of the column are the armature and core parts 5 and 6 of electric gauges 7 and 8. These gauges are in the form of variable inductive impedances wound with coils 9. When liquid flows into the column, the armature and core parts of the upper gauge separate and decrease its inductance, and the armature and core parts of the lower gauge approach each other and increase its inductance. These armature and core parts of each gauge with the coil 9 are suitably clamped to adjacent convolutions of the spiral tubular column and hence move with the particular part of the convolutions to which secured. Fig. 4 represents a form of clamp 10 that may be used for this purpose, and Fig. 5 represents a front view of a gauge unit as clamped in place.

The upper and lower inductance gauge units 7 and 8 may be conducted in different arms of a bridge circuit as represented in Fig. 6 which circuit is energized by an alternating current source 11. The other two arms of the bridge comprise parts of a fixed inductance 12. The output of the bridge is rectified by rectifiers 13 and fed to direct current measuring instrument 14. The gauges may be adjusted and the apparatus calibrated so that with the tank empty the bridge is balanced and instrument 14 reads zero, and with the tank full the bridge is unbalanced and the instrument reads full scale. The positions of the parts of the gauge units are easily adjusted to correspond to the above calibration such that the instrument scale may be graduated from left to right in liquid level units. It is to be understood that the reactance variation represented when changing from the condition of Fig. 1 to that of Fig. 2 is far in excess of that required to produce such full scale instrument deflection using conventional electrical gauging apparatus, and that this exaggeration is done for illustration purposes only.

The instrument may be provided with high and low alarm or control contacts 15 and 16, if desired, to give warning of or to prevent predetermined high and low level conditions. The apparatus described may be calibrated for full scale range operation for a small fraction of the change in liquid level indicated in the above example. As a matter of fact, for the considerable displacement of the convolutions of the spiral tubular column represented, it would be sufficient to have only one of the gauge units variable to obtain ample sensitivity for most purposes. Also as represented in Fig. 8, a single armature 17 secured to the movable spiral could be differentially moved relative to two stationary reactance core members 7' and 8' taking the place of members 7 and 8 in the circuit of Fig. 6. The pressure within the sealed tank is not required to be at atmospheric pressure. Other forms of variable impedances might be used in place of the inductive impedances.

In Fig. 7 instead of the variable impedance bridge circuit for measuring the deformation of the column, I have shown a pointer 18 moving over a scale 19. The pointer is in the form of a lever which is pivoted at 20 to a fixed support and at point 21 by a pin and slot connection to the movable spiral tubular column 3.

Fig. 8 represents a single armature 17 secured to a pipe 30 arranged to be vertically movable in response to liquid therein, for example as hereinbefore described, cooperating differentially with two reactance elements 7' and 8'.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus responsive to liquid level variations comprising a tubular liquid container shaped in the form of a loosely wound spiral, means for supporting the end portions of said spiral in fixed relation with the axis thereof substantially vertical, connections to said tubular container for permitting a variable amount of liquid to rise therein, said container being sufficiently flexible to be deformed by and in proportion to the weight of the liquid contained therein, and means responsive to such deformation of said container.

2. Apparatus responsive to liquid level variations comprising a tubular liquid container bent into the shape of a loosely wound spiral spring, means for supporting the end portions of said spiral in fixed relation to each other with the axis of said spiral substantially vertical, liquid-tight connections to said container for permitting a variable amount of liquid to rise therein, said container being sufficiently flexible to be deformed by and in proportion to the weight of the liquid contained therein, and means operated in response to such deformation for indicating the level of the liquid contained therein.

3. In combination with a liquid system, apparatus responsive to liquid levels therein comprising a pipe container coiled in the form of a helical spring having its two ends connected with said fluid system at different levels and with the axis of the helix thus formed substantially vertical such that when liquid rises in the helix its convolutions sag downward due to the weight of such liquid and recover as the coiled pipe container is emptied, an inductance gauge unit having its relatively movable parts secured to adjacent convolutions of said piping near the top thereof, a second inductance gauge unit having its relatively movable parts secured to adjacent convolutions of said piping near the bottom thereof, whereby as the piping fills with liquid the impedances of said gauge units vary inversely, and electric indicating means calibrated in terms of the liquid level in said system responsive to the difference in impedance of said units.

HANS P. KUEHNI.